United States Patent
Kimura et al.

(10) Patent No.: US 10,142,995 B2
(45) Date of Patent: *Nov. 27, 2018

(54) POWER CONTROL FOR SECONDARY COMMUNICATION SYSTEM BASED ON GUARD AREA AND DISTANCE FROM PRIMARY COMMUNICATION SYSTEM

(71) Applicant: SONY CORPORATION, Tokyo (JP)

(72) Inventors: Ryota Kimura, Tokyo (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,377

(22) Filed: Sep. 6, 2017

(65) Prior Publication Data

US 2017/0374657 A1  Dec. 28, 2017

Related U.S. Application Data

(63) Continuation of application No. 15/378,909, filed on Dec. 14, 2016, now Pat. No. 9,781,725, which is a (Continued)

(30) Foreign Application Priority Data

Aug. 26, 2011  (JP) ................. 2011-184323

(51) Int. Cl.
*H04W 52/28* (2009.01)
*H04W 16/14* (2009.01)
*H04W 72/04* (2009.01)

(52) U.S. Cl.
CPC ......... *H04W 72/048* (2013.01); *H04W 16/14* (2013.01); *H04W 52/283* (2013.01);
(Continued)

(58) Field of Classification Search
CPC ... H04W 16/14; H04W 14/18; H04W 52/283; H04W 72/048
(Continued)

(56) References Cited

U.S. PATENT DOCUMENTS 8,041,380 B2  10/2011  Hamdi et al.
8,086,258 B2  12/2011  Fujii et al.
(Continued)

FOREIGN PATENT DOCUMENTS

CN  101803431 A  8/2010
EP  2140726 A2  1/2010
(Continued)

OTHER PUBLICATIONS

Ryo Sawai, "Expectation for IEEE P802.19.1 system from a primary protection viewpoint", IEEE 802.19-10-0101-00-0001, http://www.google.co.jp/url?q=https://mentor.ieee.org/802.19/dcn/10/19-10-0101-00/0001-expectation-for-ieee-p802-19-1-system-from-a-primary-protection-viewpoint-1.pptx, Jul. 16, 2010.
(Continued)

Primary Examiner — Philip Sobutka
(74) Attorney, Agent, or Firm — Chip Law Group

(57) ABSTRACT

Provided is a communication control device including an information acquisition unit acquiring first information concerning a position a guard area for a first wireless communication system and second information concerning a position of a master node of a second wireless communication system which is secondarily operated using a frequency channel used by the first wireless communication system, a determination unit determining, using the first information and the second information acquired by the information acquisition unit, whether or not an interval between a reference point of the first wireless communication system and the master node meets a condition which depends on a
(Continued)

width of the guard area and a communication distance assumed for the second wireless communication system, and a control unit causing the second wireless communication system to be operated with a given transmission power if the determination unit determines the interval meets the condition.

20 Claims, 14 Drawing Sheets

Related U.S. Application Data continuation of application No. 14/238,277, filed as application No. PCT/JP2012/065483 on Jun. 18, 2012, now Pat. No. 9,544,903.

(52) U.S. Cl.
CPC ... *H04W 72/0406* (2013.01); *H04W 72/0453* (2013.01); *H04W 72/0473* (2013.01)

(58) Field of Classification Search
USPC .................. 455/509, 454, 453, 522, 446–449
See application file for complete search history.

(56) References Cited

U.S. PATENT DOCUMENTS

| | | | |
|---|---|---|---|
| 8,315,663 | B2 | 11/2012 | Hamdi et al. |
| 8,320,304 | B2 | 11/2012 | Deb et al. |
| 8,521,094 | B2 | 8/2013 | Hamdi et al. |
| 9,544,903 | B2 * | 1/2017 | Kimura ................. H04W 16/14 |
| 9,781,725 | B2 * | 10/2017 | Kimura ............... H04W 72/048 |
| 2008/0268892 | A1 | 10/2008 | Hamdi et al. |
| 2013/0310104 | A1 | 11/2013 | Hamdi et al. |

FOREIGN PATENT DOCUMENTS

| | | | |
|---|---|---|---|
| JP | 2009-100452 | A | 5/2009 |
| JP | 2011-517139 | A | 5/2011 |
| KR | 10-2010-0015885 | A | 2/2010 |
| WO | 2009/050588 | A2 | 4/2009 |

OTHER PUBLICATIONS

"Second Report and Order and Memorandum Opinion and Order", Federal Communications Commission Washington, D.C. 20554,Internet<URL:http://hraunfoss.fcc.gov/edocs_public/attachmatch/FCC-08-260A1.pdf>, Aug. 15, 2011.

"Standard ECMA-392 MAC and PHY for Operation in TV White Space", http://www.ecma-international.org/publications/standards/Ecma-392.htm, Aug. 15, 2011.

Hamdi, et al., "Power Control in Cognitive Radio Systems Based on Spectrum Sensing Side Information", IEEE International Conference on Communications, Jun. 24-28, 2007, 05 pages.

Tandra, et al., "What is a Spectrum Hole and What Does it Take to Recognize One?", Proceedings of the IEEE, vol. 97, Issue 5, May 2009, pp. 824-848.

European Search Report of EP Patent Application No. 12828121.9, dated Oct. 29, 2015, 07 pages.

Office Action for CN Patent Application No. 201280040481.8, dated Mar. 3, 2017, 09 pages of Office Action and 13 pages of English Translation.

International Search Report and Written Opinion of PCT Application No. PCT/JP2012/065483, dated Aug. 14, 2012, 06 pages of English Translation and 06 pages of ISRWO.

International Preliminary Report on Patentability of PCT Application No. PCT/JP2012/065483, dated Mar. 13, 2014, 06 pages of English Translation and 03 pages of IPRP.

Non Final Office Action for U.S. Appl. No. 14/238,277, dated Nov. 30, 2015, 13 pages.

Final Office Action for U.S. Appl. No. 14/238,277, dated May 25, 2016, 06 pages.

Notice of Allowance for U.S. Appl. No. 14/238,277, dated Sep. 12, 2016, 05 pages.

Notice of Allowance for U.S. Appl. No. 14/238,277, dated Oct. 11, 2016, 05 pages.

Notice of Allowance and Fees Due (PTOL-85) for U.S. Appl. No. 15/378,909, dated Jun. 5, 2017, 05 pages.

Non-Final Rejection for U.S. Appl. No. 15/378,909, dated Jan. 17, 2017, 05 pages.

* cited by examiner

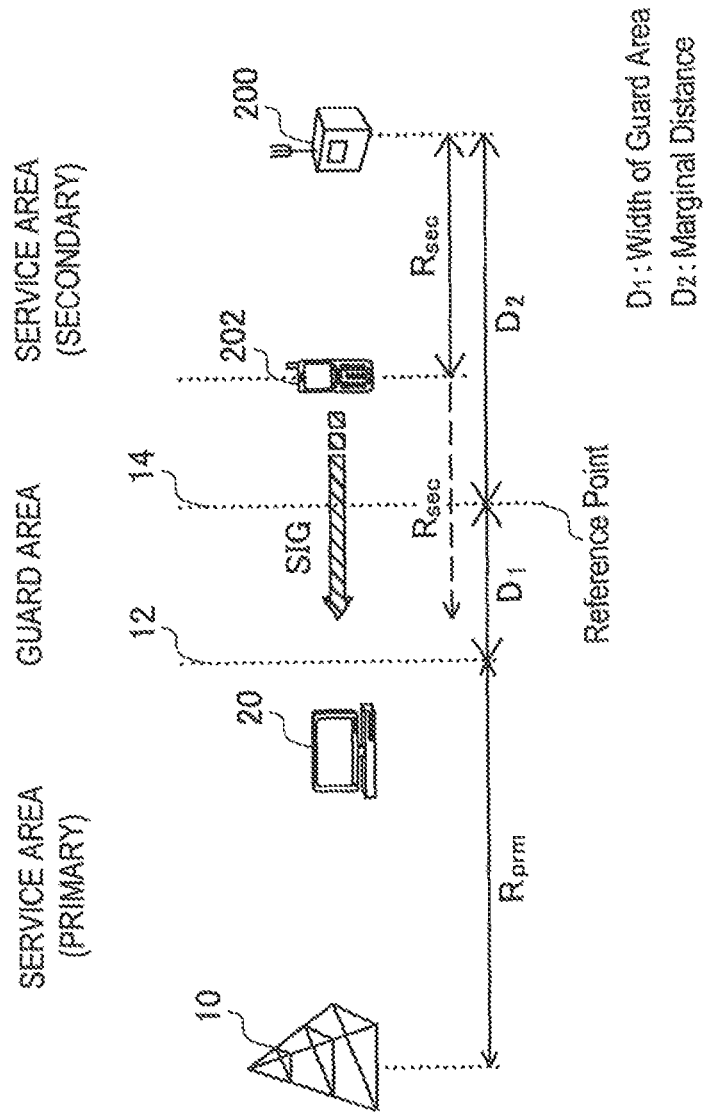

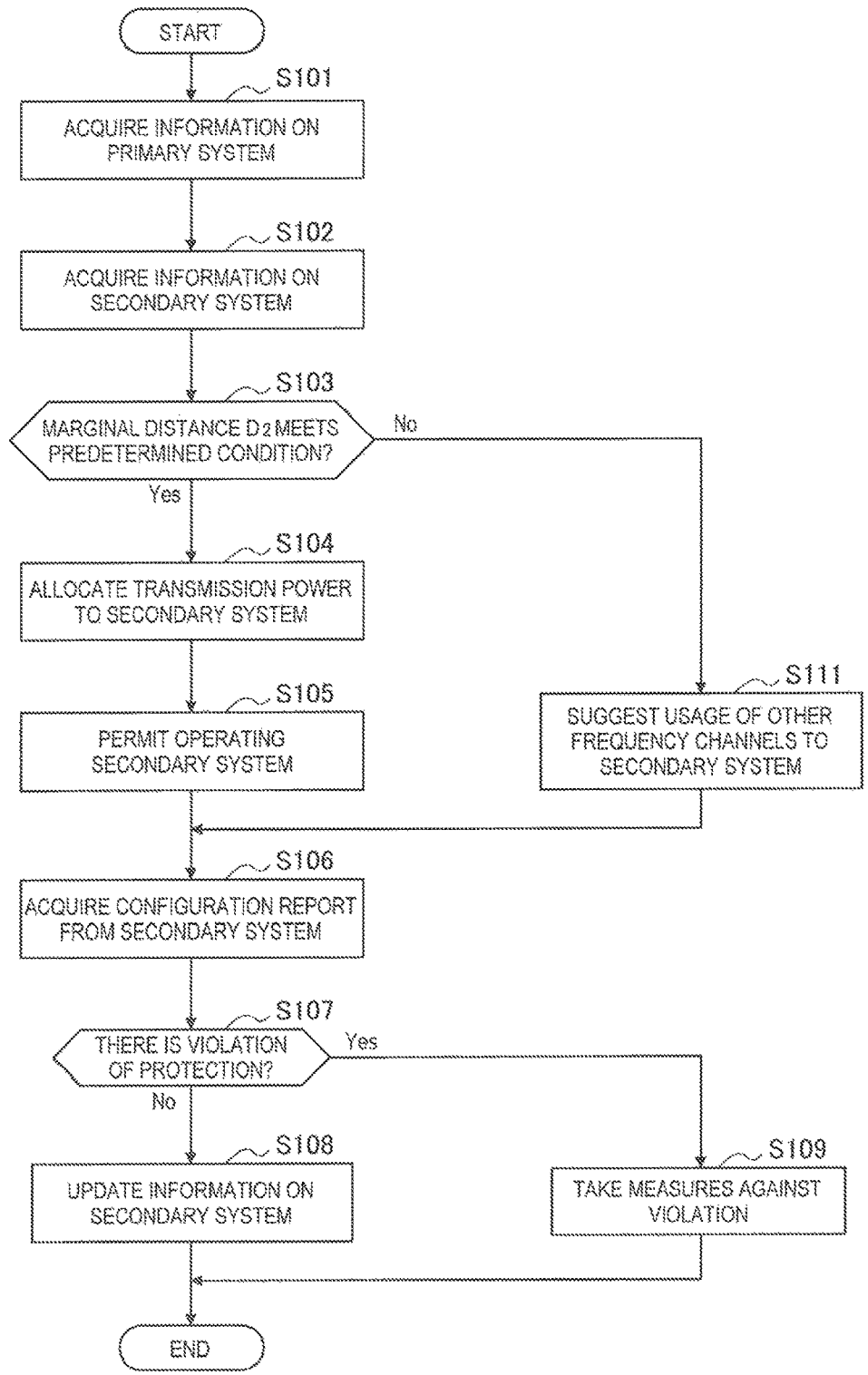

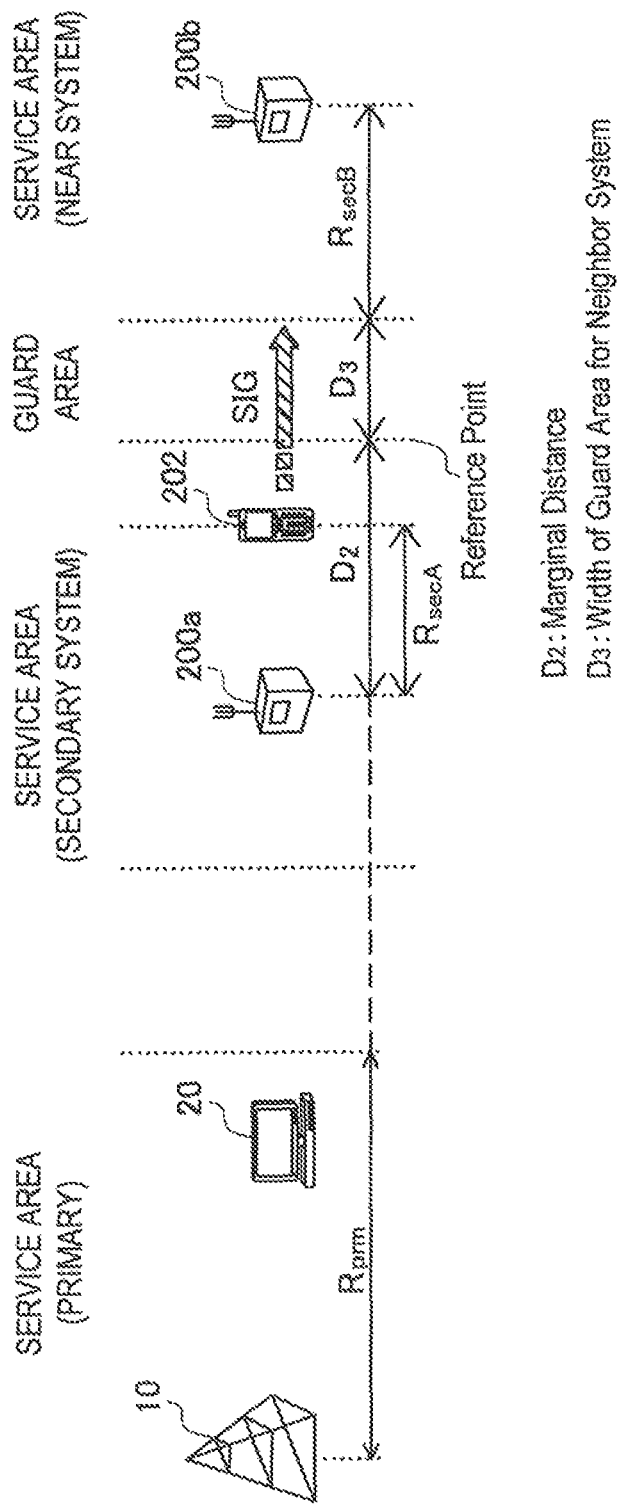

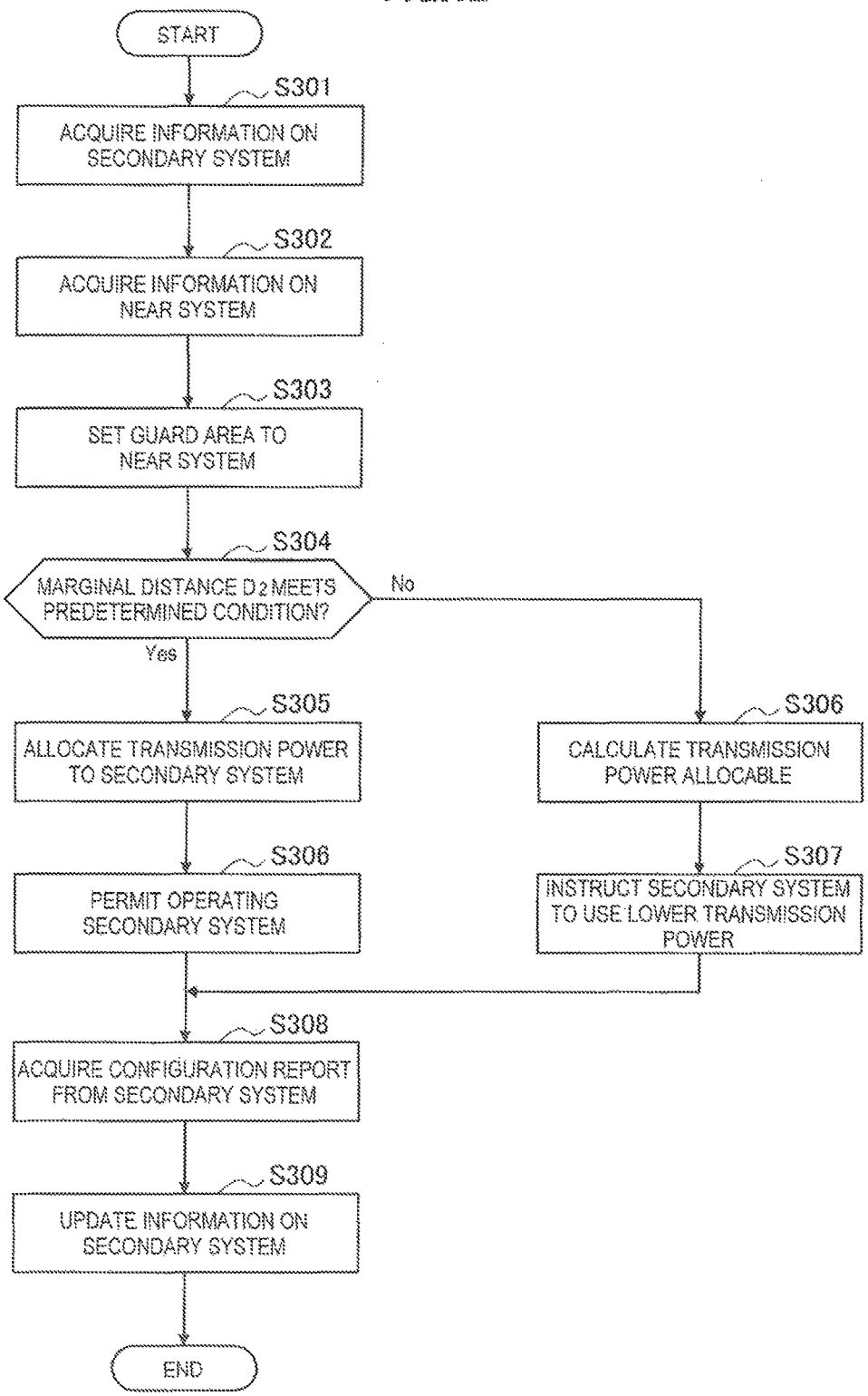

POWER CONTROL FOR SECONDARY COMMUNICATION SYSTEM BASED ON GUARD AREA AND DISTANCE FROM PRIMARY COMMUNICATION SYSTEM

CROSS-REFERENCE TO RELATED APPLICATION

The present application is a continuation application of U.S. patent application Ser. No. 15/378,909, filed Dec. 14, 2016, which is a continuation application of U.S. patent application Ser. No. 14/238,277, filed Feb. 11, 2014, which is a National Stage of PCT/JP2012/065483, filed Jun. 18, 2012, and claims the benefit of priority from prior Japanese Patent Application JP 2011-184323, filed Aug. 26, 2011, the entire content of which is hereby incorporated by reference.

TECHNICAL FIELD

The present disclosure relates to a communication control device, a communication control method, and a communication control system.

BACKGROUND ART

Secondary usage of a frequency channel is discussed as a method for alleviating future depletion of frequency resources. The secondary usage of a frequency channel is that part of or all the frequency channels preferentially allocated to a system is secondarily used by the other system. Typically, a system which is preferentially allocated with a frequency channel is called primary system and a system which secondarily uses the frequency channel is called secondary system.

A TV white space is an exemplary frequency channel whose secondary usage is discussed (see Non-Patent Literatures 1 and 2). The TV white space is a channel which is not used by a TV broadcast system depending on an area among frequency channels allocated to the TV broadcast system as a primary system. The TV white space is opened to a secondary system so that the frequency resource can be efficiently utilized. A standard for a physical layer (PHY) and a MAC layer for enabling the secondary usage of the TV white space can employ IEEE802.22, IEEE802.11af and ECMA (European Computer Manufacturer Association)-392 (CogNea, see Non-Patent Literature 3 described later).

The secondary system is generally required to operate so as not to give an excessive interference to the primary system during the secondary usage of the frequency channel. An important technique therefor is transmission power control. For example, Patent Literature 1 described later proposes therein a method for calculating a path loss from a base station as a master node of a secondary system to a reception device as a primary system and a discrete frequency width between frequency channels and determining maximum transmission power of the secondary system based on the calculation result.

CITATION LIST

Non-Patent Literature

Non-Patent Literature 1: "SECOND REPORT AND ORDER AND MEMORANDUM OPINION AND ORDER", [online], [searched on Aug. 15, 2011], Internet<URL: http://hraunfoss.fcc.gov/edocs_public/attachmatch/FCC-08-260A1.pdf>

Non-Patent Literature 2: "Standard ECMA-392 MAC and PHY for Operation in TV White Space", [online], [searched on Aug. 15, 2011], Internet<URL:http://www.ecma-international.org/publications/standards/Ecma-392.htm>

Patent Literature

Patent Literature 1: JP 2009-100452 A

SUMMARY OF INVENTION

Technical Problem

Generally, the secondary system includes a master node as a device voluntarily operating the secondary system and a slave node as a device participating in the secondary system by connecting with the master node. Naturally, not only a wireless signal transmitted from the master node but also a wireless signal transmitted from the slave node may give an interference to the primary system. However, in a case where a position of the slave node is not known at the start of operating the secondary system or the slave node is moved, and so on, it is difficult to accurately predict an influence of the wireless signal transmitted from the slave node. Moreover, if the transmission power is to be individually controlled for each slave node, a mechanism for controlling the transmission power is complexed.

Therefore, it is preferable to provide a simple mechanism able to prevent the wireless signal transmitted from the slave node from causing an excessive interference upon operating the secondary system.

Solution to Problem

According to an embodiment of the present disclosure, there is provided a communication control device including an information acquisition unit acquiring first information and second information, the first information concerning a position a guard area for a first wireless communication system, the second information concerning a position of a master node of a second wireless communication system which is secondarily operated using a frequency channel used by the first wireless communication system, a determination unit determining, using the first information and the second information acquired by the information acquisition unit, whether or not an interval between a reference point of the first wireless communication system and the master node meets a condition which depends on a width of the guard area and a communication distance assumed for the second wireless communication system, and a control unit causing the second wireless communication system to be operated with a given transmission power if the determination unit determines the interval meets the condition.

According to an embodiment of the present disclosure, there is provided a communication control method, for a communication control device controlling a second wireless communication system which is secondarily operated using a frequency channel used by a first wireless communication system, the method including acquiring first information and second information, the first information concerning a position of a guard area for the first wireless communication system, the second information concerning a position of a master node of the second wireless communication system, determining, using the acquired first information and the second information, whether or not an interval between a reference point of the first wireless communication system and the master node meets a condition which depends on a width of the guard area and a communication distance assumed for the second wireless communication system, and causing the second wireless communication system to be operated with a given transmission power if the interval is determined to meet the condition.

According to an embodiment of the present disclosure, there is provided a communication control system including a master node of a second wireless communication system which is secondarily operated using a frequency channel used by a first wireless communication system, and a communication control device which controls operation of the second wireless communication system performed by the master node. The communication control device include an information acquisition unit acquiring first information and second information, the first information concerning a position of a guard area for the first wireless communication system, the second information concerning a position of the master node, a determination unit determining, using the first information and the second information acquired by the information acquisition unit, whether or not an interval between a reference point of the first wireless communication system and the master node meets a condition which depends on a width of the guard area and a communication distance assumed for the second wireless communication system, and a control unit causing the master node to operate the second wireless communication system with a given transmission power if the determination unit determines the interval meets the condition.

Advantageous Effects of Invention

According to the present disclosure, the wireless signal transmitted from the slave node can be prevented from causing an excessive interference upon operating the secondary system.

BRIEF DESCRIPTION OF DRAWINGS

FIG. 6 is an explanatory diagram for explaining an exemplary parameter regarding a distance used in one embodiment.

FIG. 7B is a flowchart illustrating an illustrative second scenario of the power allocation processing by the secondary system manager.

FIG. 11 is an explanatory diagram for explaining an exemplary parameter regarding a distance used for an interference control between the secondary systems.

FIG. 12 is a flowchart illustrating an exemplary flow of the power allocation processing by the secondary system manager for the interference control between the secondary systems.

DESCRIPTION OF EMBODIMENTS

Figure 1:
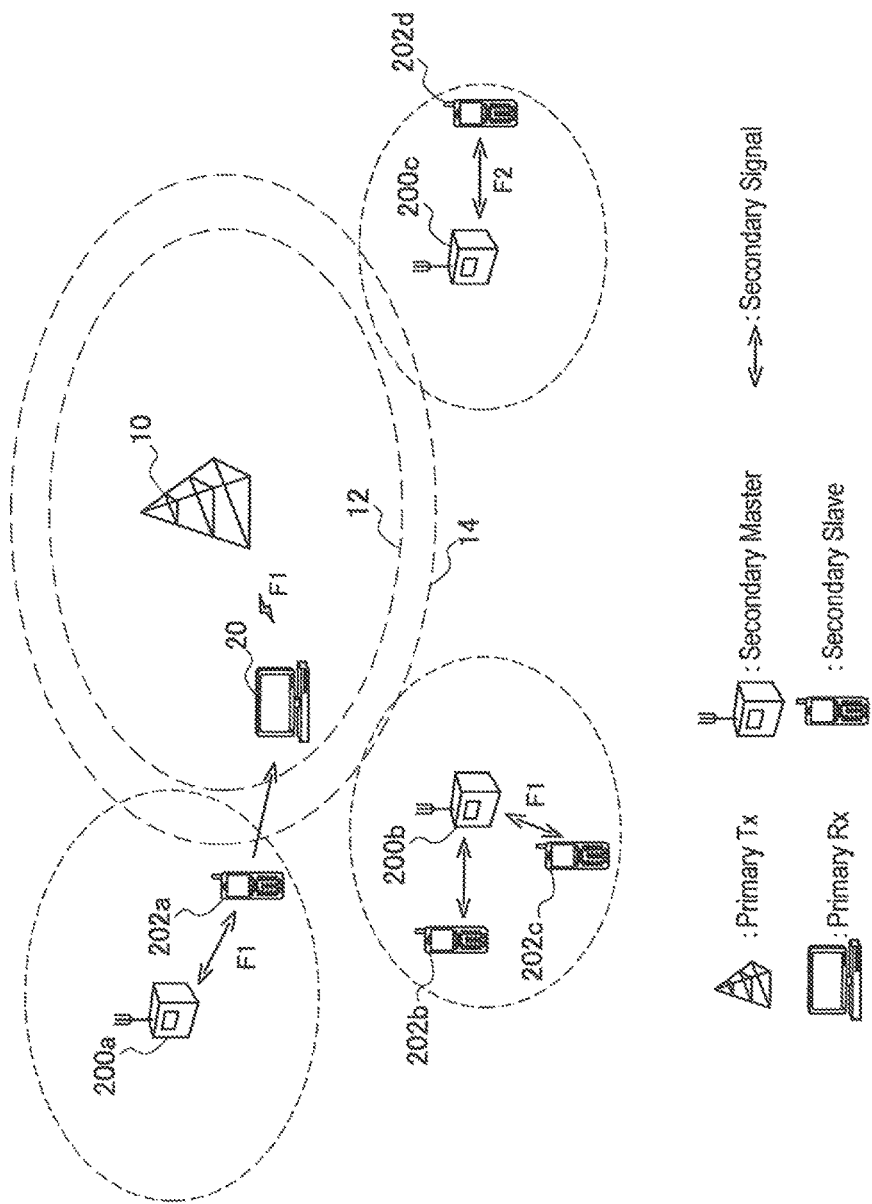
FIG. 1 is an explanatory diagram for explaining an interference a primary system suffers upon secondary usage.

Hereinafter, preferred embodiments of the present invention will be described in detail with reference to the appended drawings. Note that, in this specification and the drawings, elements that have substantially the same function and structure are denoted with the same reference signs, and repeated explanation is omitted. A description will be given in the following order.
1. Outline of system
1-1. Problem relating to first embodiment
1-2. Outline of communication control system
2. Exemplary configuration of secondary system manager
2-1. Explanation of units
2-2. Flow of process
3. Exemplary configuration of master node
3-1. Explanation of units
3-2. Flow of process
4. Application to interference control between secondary systems
5. Conclusion
<1. Outline of System>
First, with reference to FIG. 1 to FIG. 4, a description will be given of a problem relating to a first embodiment and an outline of a communication control system.
[1-1. Problem Relating to First Embodiment]
FIG. 1 is an explanatory diagram for explaining an interference a primary system suffers upon secondary usage. With reference to FIG. 1, there are illustrated a primary transmission station 10 for providing services of the primary system, and a primary reception station 20 positioned within a service area for the primary system. The primary transmission station 10 may be a TV broadcast station, or a wireless base station or repeater station in a cellular communication system, for example. The cellular communication system may include the GSM, UMTS, WCDMA, CDMA2000, LTEm, LTE-Advanced, IEEE802.16, WiMAX or WiMAX2, and the like. When the primary transmission station 10 is a TV broadcast station, the primary reception station 20 is a receiver having an antenna or tuner for receiving TV broadcast. When the primary transmission station 10 is a wireless base station in a cellular communication system, the primary reception station 20 is a wireless terminal operating in accordance with the cellular communication system. In the example of FIG. 1, a channel F1 is allocated to the primary transmission station 10. The primary transmission station 10 provides TV broadcast services, wireless communication services or some other wireless services by transmitting wireless signals on the channel F1. FIG. 1 also shows a boundary 12 of the service area and an outer border 14 of a guard area for the primary system.

FIG. 1 further shows master nodes 200a, 200b, and 200c each operating the secondary system. Each of master nodes uses the channel F1 allocated to the primary system or near channel (e.g., channel F2) to operate the secondary system respectively. In the example of FIG. 1, a slave node 202a participates in the secondary system operated by the master node 200a on the channel F1. Slave nodes 202b and 202c participate in the secondary system operated by the master node 200b on the channel F1. A slave node 202d participates in the secondary system operated by the master node 200c a channel F2. Here, the master node of the secondary system may be a wireless access point which is compliant with or partially uses a wireless communication system such as IEEE802.22, IEEE802.11, or ECMA, or may be a wireless base station or repeater station which is compliant with the cellular communication system or partially uses standards thereof. If the secondary system is operated in accordance with the cellular communication system, the cellular communication system may be the same as or different from that of the primary system. The slave node of the secondary system is a wireless communication terminal supporting the wireless communication system the same as the master node. The master nodes 200a, 200b, and 200c may operate the secondary system in accordance the same wireless communication system, or may operate the secondary system in accordance with the wireless communication systems different from each other. At least the master node of the secondary system is typically prohibited from operating within the guard area for the primary system by regulations. The slave node may be also prohibited from operating within the guard area.

Figure 2:
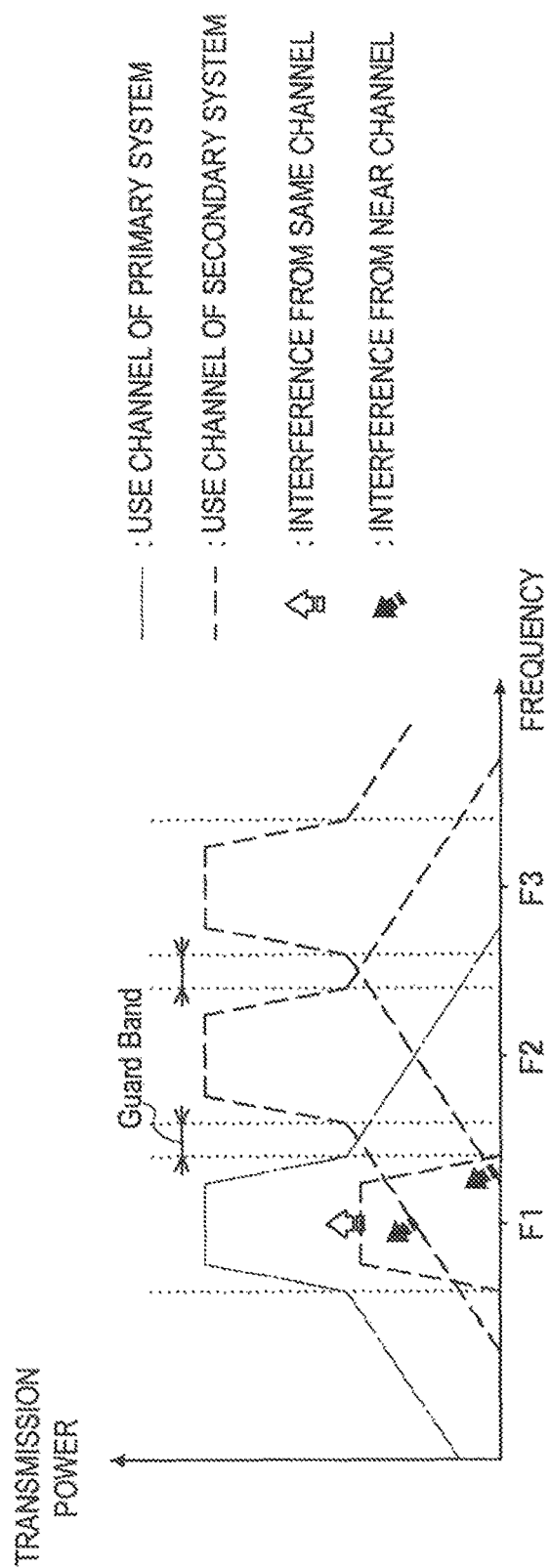
FIG. 2 is an explanatory diagram for explaining an in-band interference and a between-band interference.

Under the circumstances such as of FIG. 1, the primary reception station 20 may be influenced by an interference due to the wireless signals transmitted from secondary transmission stations (both master node and slave node). FIG. 2 is an explanatory diagram for explaining an in-band interference and a between-band interference. In the example of FIG. 2, the channel F1 is a use channel of the primary system. The channel F2 is a channel adjacent to the channel F1. The channel F3 is a channel adjacent to the channel F2. A guard band is provided between the channel F1 and the channel F2, and between the channel F2 and the channel F3. However, even if these channels F2 and F3 are used by the secondary system, as illustrated in FIG. 2, a considerable interference may occur from a near channel (such as channels F2, F3 and other channels) due to out-band radiation.

In the example of FIG. 1, the slave node 202a is positioned closer to the primary reception station 20 than the master node 200a. For this reason, if the slave node 202a uses a transmission power equivalent to that of the master node 200a, the wireless signal from the slave node 202a may give an excessive interference to the primary reception station 20. On the other hand, the slave nodes 202b and 202c are positioned farther from the primary reception station 20 than the master node 200b. For this reason, even if the slave nodes 202b and 202c use a transmission power equivalent to that of the master node 200b, the wireless signal from each slave node 202 does not give an excessive interference to the primary reception station 20. The same goes for the slave node 202d.

With existing method, each master node of the secondary system controls the transmission power used by the master node and slave node in the secondary system in order to restrict the interference given to the primary system. However, in a case where the position of the slave node is not known at the start of operating the secondary system, or the slave node is moved, and so on, if the transmission power for the slave node is to be dynamically controlled in response to appearance, move and disappearance of the slave node, a mechanism for controlling the transmission power exceedingly becomes complex. Moreover, an overhead of signaling increases. Therefore, it is preferable to provide a mechanism able to stably prevent the interference to the primary system using a simpler mechanism.

[1-2. Outline of Communication Control System]

Figure 3:
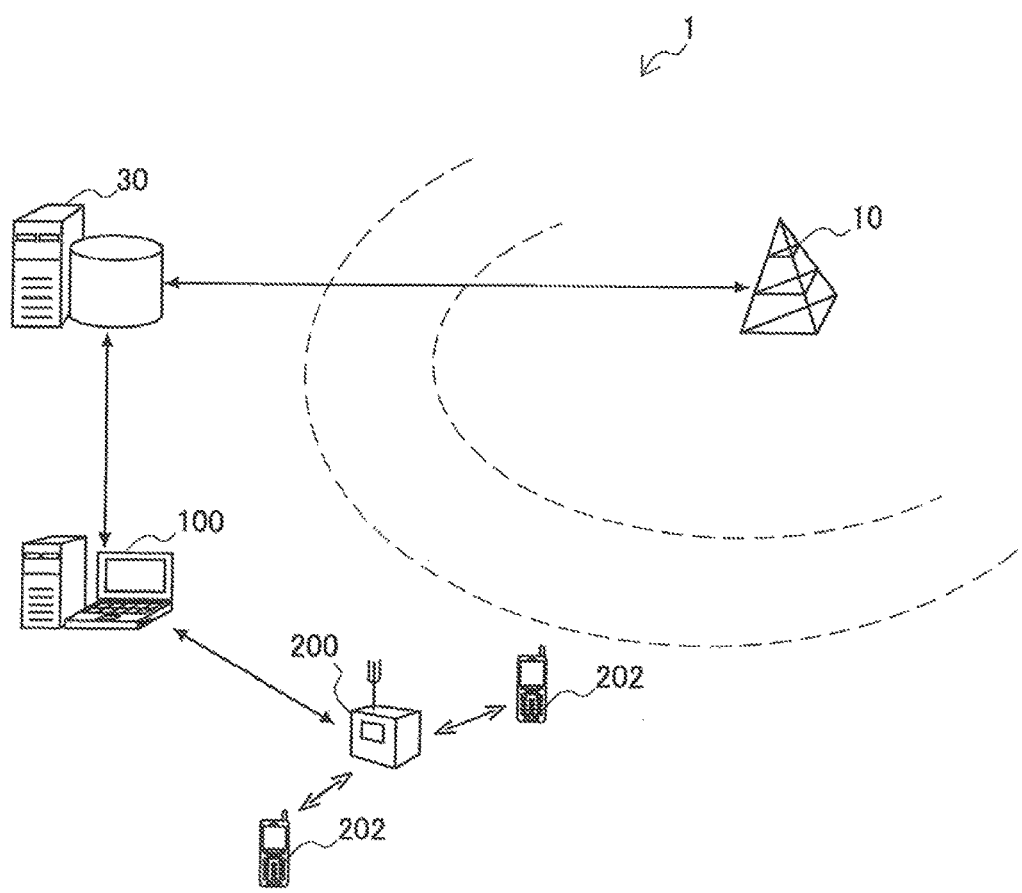
FIG. 3 is as explanatory diagram for explaining a configuration of a communication control system according to one embodiment.

FIG. 3 an explanatory diagram for explaining a configuration of a communication control system 1 according to one embodiment of the technology of the present invention. With reference to FIG. 3, the communication control system 1 includes the primary transmission station 10, a data server 30, a secondary system manager (SSM) 100, and a master node 200. Here, in the example of FIG. 3, only one master node 200 is illustrated, but actually more master nodes may exist. One or more slave nodes 202 participate in the secondary system operated by the master node 200.

The data server 30 is a server device a having a database storing therein data on secondary usage. The data server 30 accepts an access from the master node 200 to provide data indicating secondarily usable channels and position data of the transmission station 10 of the primary system to the master node 200. Additionally, the master node 200 registers information on the secondary system in the data server 30 at the start of the secondary usage. Communication between the data server 30 and the master node 200 may be made via an arbitrary network such as the Internet. Refer to Non-Patent Literature 1 describing the secondary usage of the TV white space for an exemplary specification of the data server like this.

The secondary system manager (SSM) 100 is a communication control device having a role as a manager managing the secondary usage of a frequency channel. The SSM 100 allocates the transmission power to the respective secondary systems so that the interference due to operating the secondary system may not give an excessive influence to the primary system. The SSM 100 can access to the data server 30 via a network such as the Internet, for example, and acquires data used for transmission power allocation from the data server 30. In addition, the SSM 100 is communicably connected with also the respective master nodes 200. Then, the SSM 100, in response to a request from the master node 200 or primary system, or periodically, allocates the transmission power to the secondary system. Note that, without limited to the example of FIG. 3, the SSM 100 may be mounted on physically the same device as the data server 30 or any master node 200.

Figure 4:
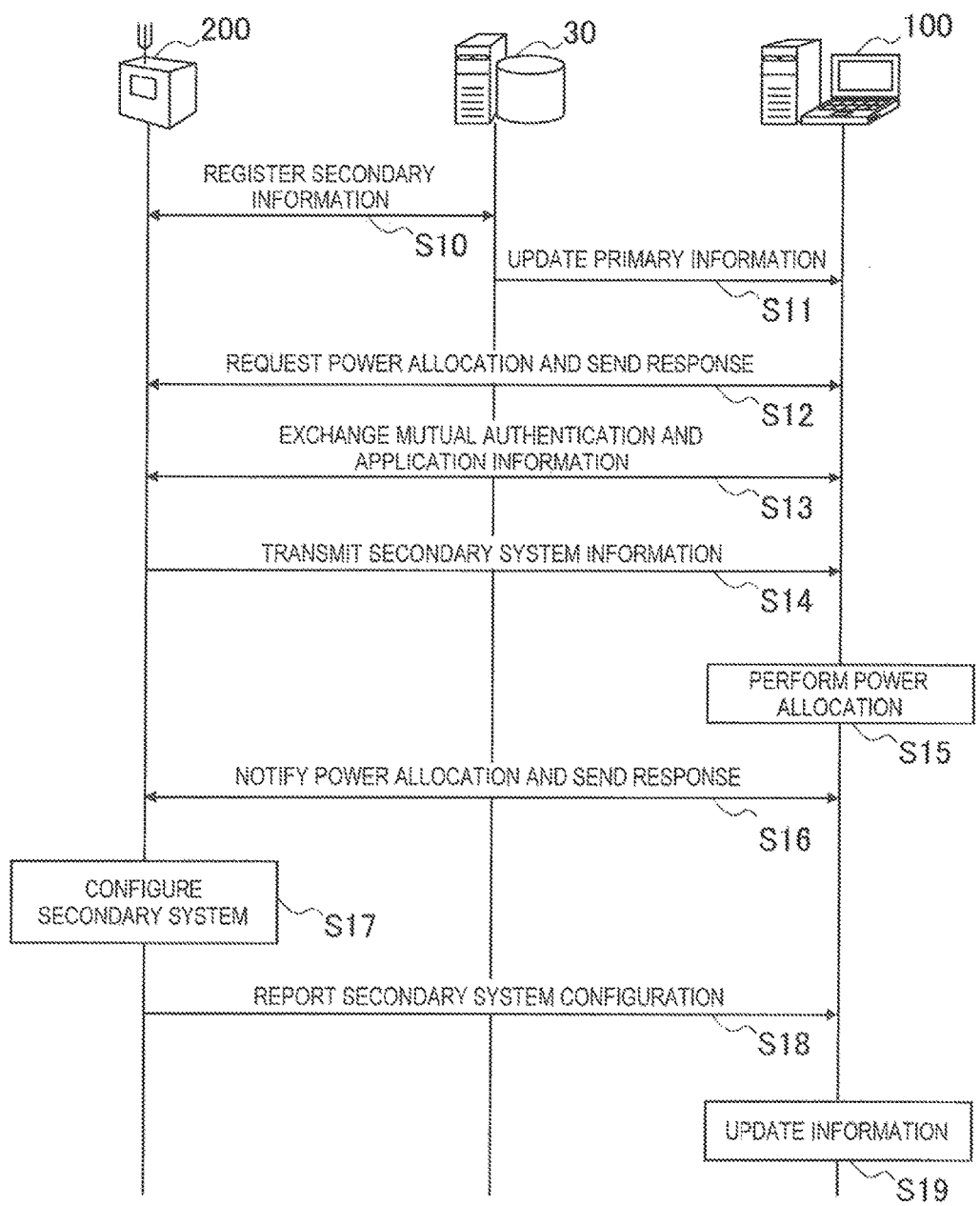
FIG. 4 is a sequence diagram illustrating an exemplary schematic flow of a communication control processing performed in the communication control system according to one embodiment.

FIG. 4 is a sequence diagram illustrating an exemplary schematic flow of a communication control processing performed in the communication control system.

First, the master node 200 registers information of the secondary system in the data server 30 at the start of the secondary usage (step S10). The information registered here includes, for example, an ID, class and position of a device starting the secondary usage and the like. Moreover, in response to the registration of the information on the secondary system, the data server 30 notifies the master node 200 of information for configuring the secondary system such as a list of channel numbers of secondarily usable frequency channels, acceptable maximum transmission power and spectrum mask.

Further, the SSM 100 receives information on the primary system from the data server 30 periodically, for example, and uses the received information to update information stored in itself (step S11). Here, the received information may include one or more of the position data of the primary transmission station 10, height of an antenna, width of the guard area, list of channel numbers of the frequency channels, acceptable interference amount of the primary system, list of IDs of the registered master nodes 200, and other parameters. Here, the SSM 100 may indirectly receive all or a part of the information on the primary system (e.g., list of channel numbers) from the master node 200.

Next, a request for power allocation is transmitted from the master node 200 to the SSM 100 (step S12). When a response is returned to the request for power allocation, mutual authentication and application level information are exchanged between the SSM 100 and the master node 200 (step S13). Additionally, the information on the secondary system is transmitted from the master node 200 to the SSM 100 (step S14). The information transmitted here may include an ID, class position data of the master node 200, channel number of the frequency channel (the use channel) selected by the master node 200, and a desired communication distance, for example.

Next, the SSM 100 performs the power allocation on the basis of the information acquired from the data server 30 and master node 200 (step S15). The power allocation processing here by the SSM 100 will be described in detail later. Next, the SSM 100 notifies the master node 200 of a result of the power allocation (step S16).

Next, the master node 200 configures the secondary system on the basis of the power allocation result notified by the SSM 100, and starts to operate the secondary system (step S17). Moreover, the master node 200 reports a result of the secondary system configuration to the SSM 100 (step S18). The SSM 100 updates the information on the secondary system stored in itself in response to the report from master node 200 (step S19).

<2. Exemplary Configuration of Secondary System Manager>

Figure 5:
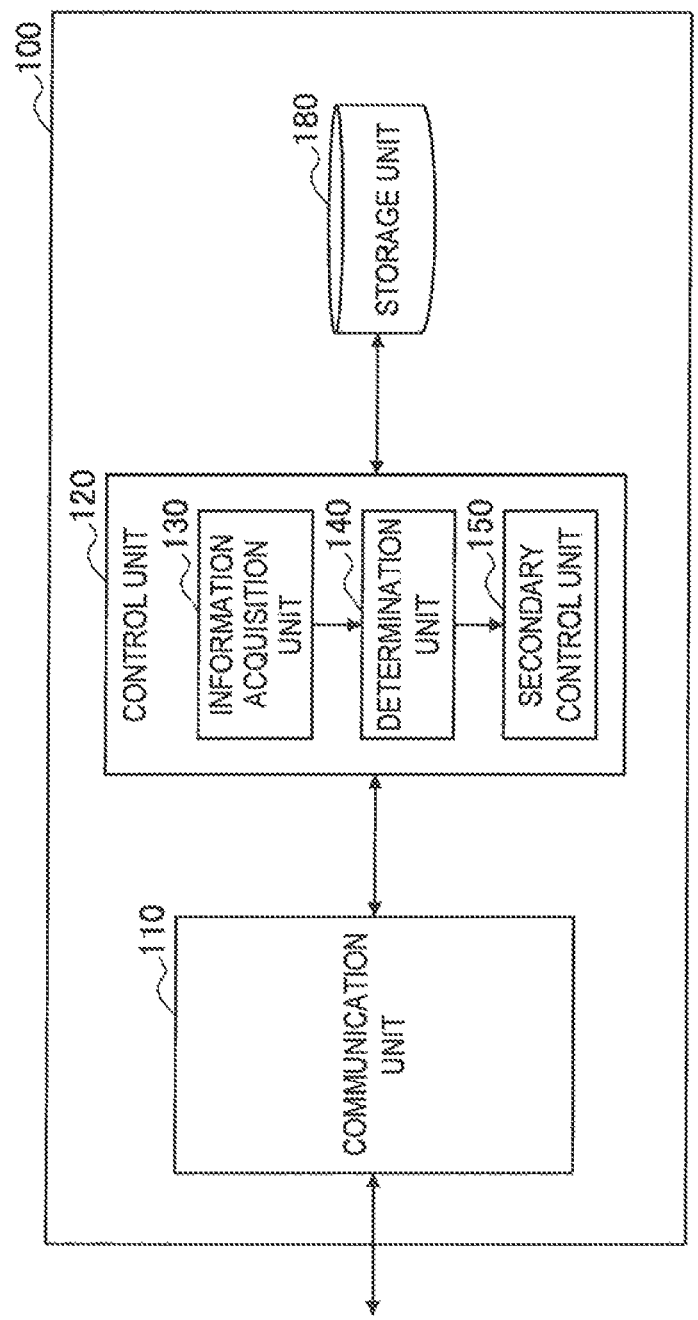
FIG. 5 is a block diagram illustrating an exemplary configuration of a secondary system manager according to one embodiment.

FIG. 5 is a block diagram illustrating an exemplary configuration of the secondary system manager (SSM) 100 illustrated in FIG. 3. With reference to FIG. 5, the SSM 100 includes a communication unit 110, a control unit 120, and a storage unit 180. The control unit 120 includes an information acquisition unit 130, a determination unit 140, and a secondary control unit 150.

[2-1. Explanation of Units]
(1) Communication Unit

The communication unit 110 is a communication interface for communication of the SSM 100 with the data server 30 and with the master node 200. Communication between the SSM 100 and the data server 30, and between the SSM 100 and the master node 200 may be achieved by any of a wired communication or wireless communication, or a combination thereof.

(2) Information Acquisition Unit

The information acquisition unit 130 acquires various information items the SSM 100 uses for allocating the transmission power to the secondary system from the data server 30 and the master node 200 of the secondary system. For example, the information acquisition unit 130 receives the information on the primary system from the data server 30. The information on the primary system includes a first information concerning the guard area for the primary system. In addition, for example, the information acquisition unit 130 receives the information on the secondary system from the master node 200 of the secondary system. The information on the secondary system includes a second information concerning the position of the master node 200. Then, the information acquisition unit 130 outputs the acquired information to the determination unit 140.

(3) Determination Unit

The determination unit 140 uses the first and second information acquired by the information acquisition unit 130 to determine whether or not an interval between a reference point of the primary system and the master node 200 meets a condition which depends on the width of the guard area for the primary system and the communication distance assumed for the secondary system. Then, the determination unit 140 outputs a determination result to the secondary control unit 150. The reference point of the primary system may be typically the closest point to the master node 200 on the outer border 14 of the guard area. Alternatively, the reference point may be any point defined within the service area or guard area for the primary system.

The above condition used by the determination unit 140 may be expressed using the parameter regarding the distance illustrated in FIG. 6. In the example of FIG. 6, a distance $D_1$ represents the width of the guard area. A distance $D_2$ represents an interval between the above reference point and the master node 200. In this description, such interval $D_2$ is referred to as a marginal distance. FIG. 6 also shows a communication distance $R_{prm}$ of the primary system (e.g., radius of the service area) and a communication distance $R_{sec}$ assumed for the secondary system. The communication distance $R_{sec}$ assumed for the secondary system may be, for example, a communication distance desired for the secondary system notified to the SSM 100 by the master node 200. Alternatively, the communication distance $R_{sec}$ assumed for the secondary system may be held in the SSM 100 in advance. The communication distance $R_{sec}$ held in the SSM 100 in advance may be, for example, an acceptable communication distance about the secondary system.

In the example of FIG. 6, assume that a next conditional expression (1) holds between the width of the guard area $D_1$, marginal distance $D_2$, and communication distance $R_{sec}$, for example. Here, in various conditional expressions illustrated in this description, an inequality sign may be used instead of an equality sign.

$$D_2 \geq 2 \cdot R_{sec} - D_1 \tag{1}$$

In this case, even if the slave node positioned around an edge of the service area for the secondary system uses the same transmission power as the master node, the wireless signal (SIG in the figure) transmitted from the slave node does not practically reach the service area for the primary system. Therefore, the slave node can easily use the same transmission power as the master node, allowing a complex control of the transmission power to not be needed for the slave node.

Here, if the primary system does not have the guard area, the width of the guard area $D_1=0$ holds. In this case, the reference point may be any point on the outer border 12 of the service area for the primary system (typically, the closest point to master node 200). The first information concerning a position of the guard area for the primary system may include information indicating that the primary system does not have the guard area.

In addition, as a next expression, a weight coefficient may be introduced to the conditional expression (1).

$$D_2 \geq 2\alpha_{sec} \cdot R_{sec} - \alpha_1 D_1 \tag{2}$$

If the right side of the conditional expression (2) becomes larger owing to the weight coefficient in the conditional expression (2), a risk of the interference is more reduced.

Alternatively, for example, if no primary reception station exists around the edge of the service area for the primary system, the weight coefficient may be set such that the right side of the conditional expression (2) becomes smaller.

To be more general, these conditional expressions may be expressed by a function as follows.

$$D_2 \geq Th_1 = f(R_{sec}, D_1) \quad (3)$$

According to a conditional expression (3), the determination unit 140 uses the first and second information to determine whether or not the marginal distance $D_2$ exceeds a threshold $Th_1$ set depending on the width of the guard area $D_1$ and communication distance $R_{sec}$. Note that if the primary system has the guard area (that is, $D_1>0$), the determination unit 140 may uses a next conditional expression (4) or (5) instead of the conditional expressions (1) to (3).

$$D_2 \geq R_{sec} + D_1 \text{ and } D_1 \geq R_{sec} \quad (4)$$

$$D_2 \geq R_{sec} \text{ and } D_1 \geq R_{sec} \quad (5)$$

If the conditional expression (4) or (5) is met, the above described conditional expression (1) is inevitably met. Therefore, in these cases also, even if the slave node positioned around the edge of the service area for the secondary system uses the same transmission power as the master node, the wireless signal transmitted from the slave node does not practically reach the service area for the primary system.

(4) Secondary Control Unit

The secondary control unit 150 controls the operation of the secondary system performed by the master node 200 through signaling with the master node 200. For example, in this embodiment, if the marginal distance $D_2$ about the master node 200 meets the above described condition, the secondary control unit 150 controls the master node 200 to operate the secondary system with a given transmission power. A given transmission power may be typically a transmission power corresponding to the above communication distance $R_{sec}$ (able to accomplish the above communication distance $R_{sec}$). A given transmission power here may be applied to not only the master node 200 but also the slave node.

If the marginal distance $D_2$ about the master node 200 does not meet the above described condition, the secondary control unit 150 may carry out any of three measures described below. That is, first, the secondary control unit 150 may instruct the master node 200 to use a transmission power lower than the transmission power corresponding to the above communication distance $R_{sec}$. Second, the secondary control unit 150 may suggest usage of other frequency channels to the master node 200. Third, the secondary control unit 150 may refuse to operate the secondary system. According to the first measure, although the service area for the secondary system becomes smaller, the secondary system can be ensured to be operated. According to the second measure, while the service area for the secondary system is maintained, the secondary system can be ensured to be operated. However, the second measure is effective only when available other frequency channels exist. According to the third measure, the secondary system can be extremely easily controlled.

The secondary control unit 150 uses the storage unit 180 to manage information such as the position of the master node 200, use channel, transmission power allocated to the relevant secondary system and communication distance corresponding thereto with respect to each respective secondary system being operated. The master node 200 of each secondary system, when the configuration of the secondary system is completed, reports the configuration of the secondary system to the SSM 100. Then, the secondary control unit 150, when notified by the master node 200 of that the above given transmission power allocated to the secondary system is excessive for the relevant secondary system, updates the transmission power and communication distance about the relevant managed secondary system to a lower (shorter) value. This allows a larger amount of transmission power to be allocated to other near secondary systems. On the other hand, if the transmission power used in the configured secondary system is larger than the transmission power allocated to the relevant secondary system, the secondary control unit 150 takes measures against violation of primary system protection (e.g., warning or registration of violating device to the data server 30 and the like).

The secondary control unit 150 may notify the master node 200 of a value of the assumed communication distance $R_{sec}$ and the width of the guard area $D_1$. The value of the communication distance $R_{sec}$ here may be held the SSM 100 in advance. This allows, in a case, for example, where the master node 200 is movable, the master node 200 to move such that the marginal distance $D_2$ meets the above described condition and the master node 200 to ensure to voluntarily operate the secondary system.

(5) Storage Unit

The storage unit 180 stores a program and data for operation for the SSM 100 using a storage medium such as a hard disk or semiconductor memory.

Here, theses components of the SSM 100 shown in FIG. 5 are merely examples. That is, the SSM 100 may additionally include components not shown, and a part of the components may be omitted from the configuration of the SSM 100.

[2-2. Flow of Process]

In this section, a description will be given of an illustrative three scenarios of the power allocation processing by the SSM 100.

(1) First scenario

Figure 7A:
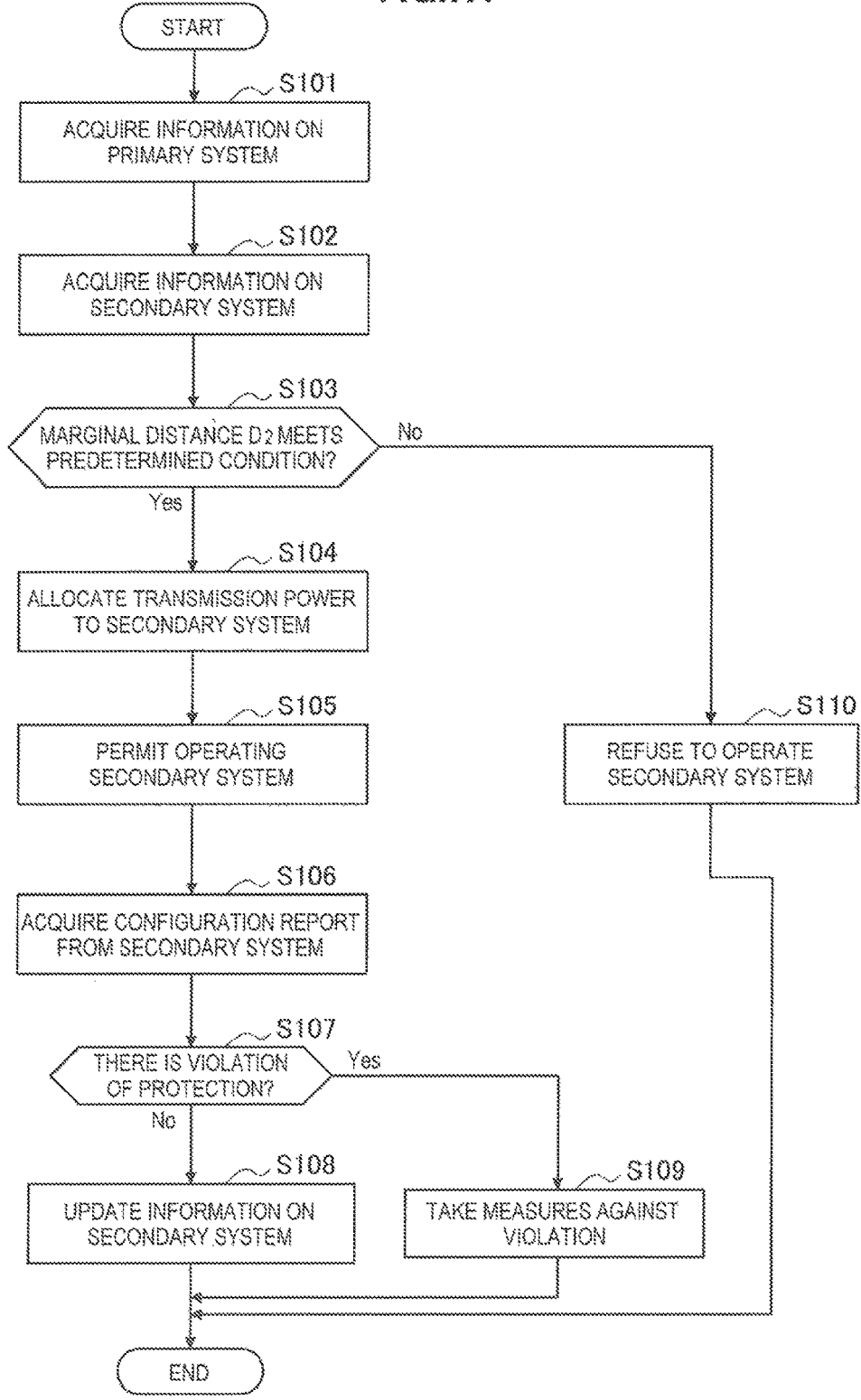
FIG. 7A is a flowchart illustrating an illustrative first scenario of a power allocation processing by the secondary system manager.

FIG. 7A is a flowchart illustrating a first scenario of the power allocation processing by the SSM 100 according to this embodiment.

In the first scenario, first, the information acquisition unit 130 acquires the information on the primary system received by the communication unit 110 from the data server 30 (step S101). The information on the primary system includes the first information concerning the position of the guard area for the primary system. Next, the information acquisition unit 130 acquires the information on the secondary system received by the communication unit 110 from the master node 200 of the secondary system (step S102). The information on the secondary system includes the second information concerning the position of the master node 200.

Next, the determination unit 140 uses the acquired first and second information to determine whether or not the marginal distance $D_2$ meets the above described predetermined condition (e.g., any of the conditional expressions (1) to (5)) which depends on the width of the guard area $D_1$ for the primary system and the communication distance $R_{sec}$ assumed for the secondary system (step S103). A value of the marginal distance $D_2$ is calculated as an interval between the reference point of the primary system and the master node 200. The reference point of the primary system may be decided as, for example, the closest point to the master node 200 on the outer border of the guard area using the first and second information.

If the marginal distance $D_2$ is determined to meet a predetermined condition at step S103, the secondary control unit 150 allocates a given transmission power corresponding to the communication distance $R_{sec}$ to the secondary system (step S104). Then, the secondary control unit 150 permits the master node 200 to operate the secondary system (step S105).

Next, the secondary control unit 150 acquires the report on the configuration of the secondary system from the master node 200 having configured the secondary system (step S106). Then, the secondary control unit 150 verifies there is no violation of primary system protection (step S107). If there is no violation of primary system protection, the secondary control unit 150 updates the information on the secondary system which is managed in the storage unit 180 (step S108). On the other hand, there is any violation of primary system protection, the secondary control unit 150 takes measures against the violation (step S109).

In addition, in the first scenario, if the marginal distance $D_2$ is determined to not meet a predetermined condition at step S103, the secondary control unit 150 notifies the master node 200 of the operation of the secondary system being refused (step S110). In this case, the secondary system does not start be operated by the master node 200.

(2) Second Scenario

FIG. 7B is a flowchart illustrating a second scenario of the power allocation processing by the SSM 100 according to this embodiment. Processes from step S101 to step S109 in the second scenario are similar to those in the first scenario.

In the second scenario, if the marginal distance $D_2$ is determined to not meet a predetermined condition at step S103, the secondary control unit 150 suggests usage of other frequency channels different from the frequency channel allocated to the primary system to the master node 200 (step S111). If the master node 200 accepts the usage of another frequency channel, the secondary system starts to be operated on the relevant another frequency channel.

(3) Third Scenario

Figure 7C:
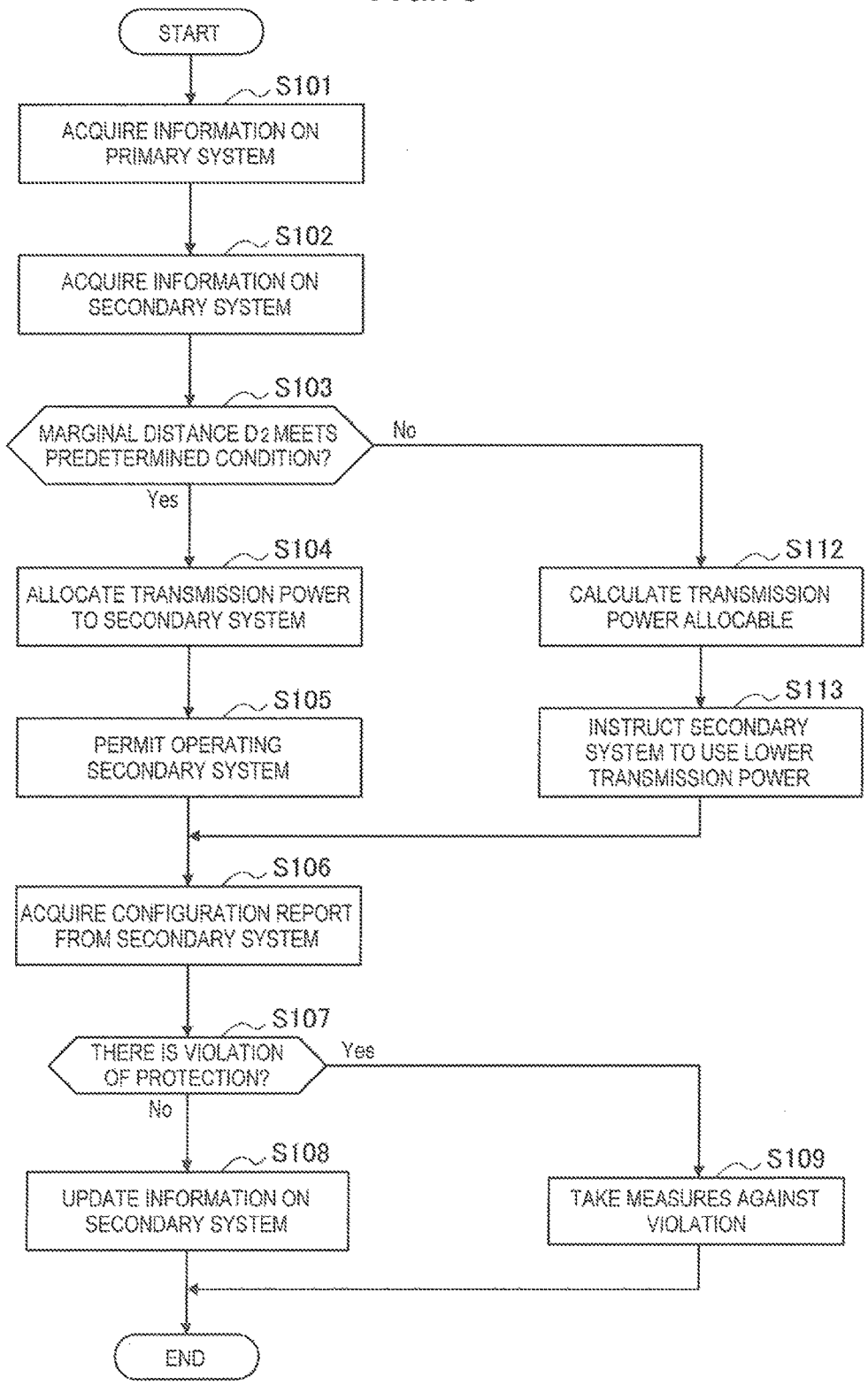
FIG. 7C is a flowchart illustrating an illustrative third scenario of the power allocation processing by the secondary system manager.

FIG. 7C is a flowchart illustrating a third scenario of the power allocation processing by the SSM 100 according to this embodiment. Processes from step S101 to step S109 in the third scenario are similar to those in the first scenario and second scenario.

In the third scenario, if the marginal distance $D_2$ is determined to not meet a predetermined condition at step S103, the secondary control unit 150 calculates a transmission power allocable to the secondary system (step S112). For example, the allocable transmission power may be calculated such that a reception power of the wireless signal from the relevant slave node is equal to or less than the acceptable interference amount at the reference point of the primary system even in a case where the slave node is positioned around the edge of the service area for the secondary system. The transmission power which may be calculated here has a value lower than the transmission power corresponding to the above communication distance $R_{sec}$. Then, the secondary control unit 150 instructs the master node 200 to use the calculated transmission power (step S113). If the master node 200 accepts the instruction to use the transmission power, the relevant transmission power is used to start to operate the secondary system.

<3. Exemplary Configuration of Master Node>

Figure 8:
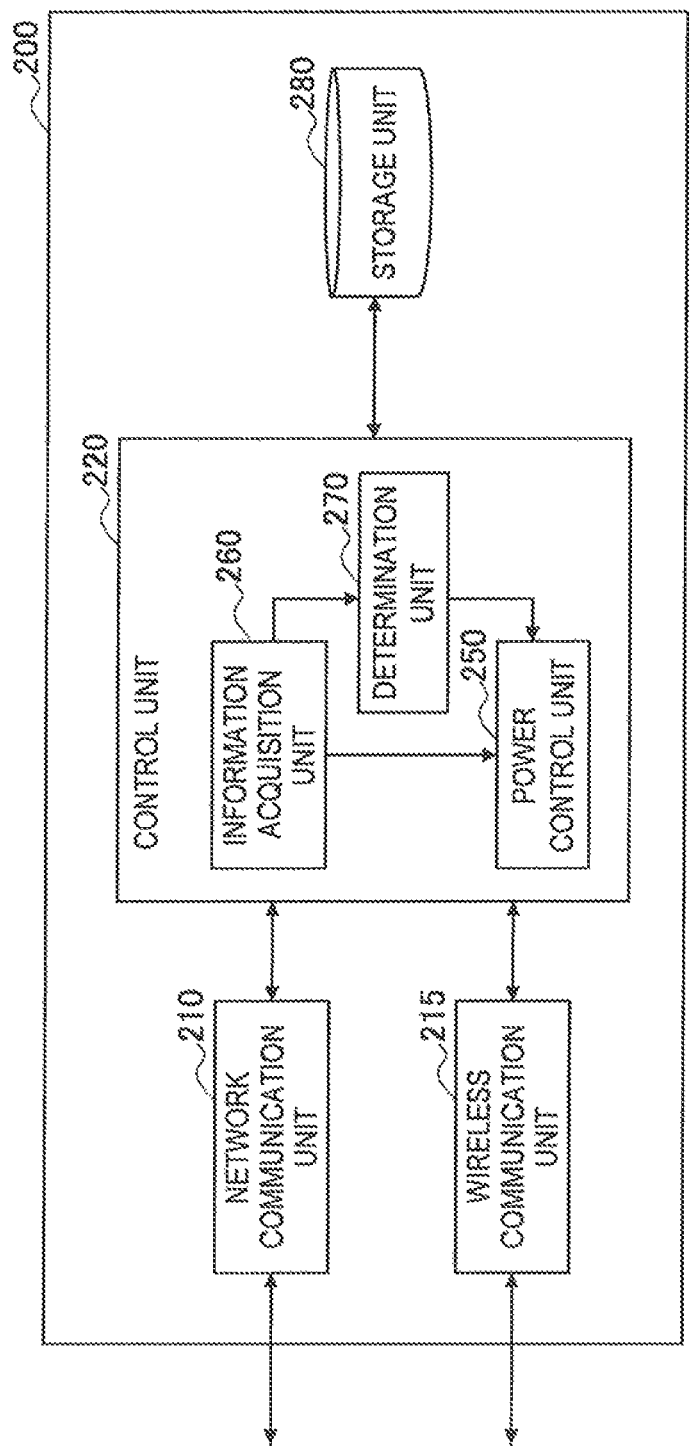
FIG. 8 is a block diagram illustrating an exemplary configuration of a master node of the secondary system according to one embodiment.

FIG. 8 is a block diagram illustrating an exemplary configuration of the master node 200 of the secondary system. With reference to FIG. 8, the master node 200 includes a network communication unit 210, wireless communication unit 215, control unit 220, and storage unit 280.

The control unit 220 includes a power control unit 250, information acquisition unit 260, and determination unit 270.

[3-1. Explanation of Units]

(1) Network Communication Unit

The network communication unit 210 is a communication interface for communication of the master node 200 with the data server 30 and with the SSM 100. Communication between the master node 200 and the data server 30, and between the master node 200 and the SSM 100 may be achieved any of a wired communication or wireless communication, or a combination thereof.

(2) Wireless Communication Unit

The wireless communication unit 215 is a communication interface performing wireless communication with one or more slave nodes participating in the secondary system operated by the master node 200. For example, the wireless communication unit 215 broadcasts a control signal such as a beacon or reference signal using the transmission power set by the power control unit 250 described later. The relevant control signal includes control information indicating a set value of the transmission power. The slave node, in receiving the relevant control signal, may use the same transmission power as the master node 200 to participate in the secondary system operated by the master node 200.

(3) Power Control Unit

The power control unit 250 controls the transmission power for the secondary system operated by the master node 200. In this embodiment, the power control unit 250 before starting to operate the secondary system, registers the information on the secondary system in the data server 30. Then, the power control unit 250, for example, selects a channel used for the secondary system from the list of the channel numbers of the secondarily usable frequency channels provided by the data server 30. Then, the power control unit 250 requests the transmission power allocation from the SSM 100. The power control unit 250 provides to the SSM 100 the information on the secondary system used by the SSM 100 for the transmission power allocation. The information provided to the SSM 100 includes positional information on the master node 200 which is measured by a positioning sensor (not shown) such as a GPS (Global Positioning System) sensor or held in the storage unit 280 in advance. Moreover, the information provided to the SSM 100 may include the communication distance desired for secondary system to be operated. Then, the power control unit 250, in being notified of the transmission power to be allocated when the SSM 100 permits the secondary system to be operated, the relevant sets transmission power to the wireless communication unit 215 and starts to operate the secondary system.

If the transmission power allocated by the SSM 100 is excessive, the power control unit 250 may configure the secondary system with a lower transmission power instead of the transmission power allocated by the SSM 100. In that case, the power control unit 250, in reporting the configuration of the secondary system, notifies the SSM 100 of a value of the transmission power actually used.

Moreover, the power control unit 250, if instructed by the SSM 100 to use lower than the transmission power corresponding to the desired communication distance or suggested changing the use channel, determines whether or not the instruction or suggestion is to be accepted. In the case where the instruction or suggestion is accepted, if a desired communication service cannot be achieved, the secondary system may stop from being operated. On the other hand, if the desired communication service can be achieved even in the case where the instruction or suggestion is accepted, the power control unit 250 may start to operate the secondary system with the instructed transmission power or on another frequency channel.

(4) Information Acquisition Unit

The information acquisition unit 260 and the determination unit 270 may be optionally provided in order to determine the condition in the master node 200 about the marginal distance $D_2$. The information acquisition unit 260 acquires the first information concerning the position of the guard area for the primary system from the SSM 100. Additionally, the information acquisition unit 260 acquires the second information concerning the position of the master node 200 measured by the positioning sensor or held in the storage unit 280 in advance. Then, the information acquisition unit 260 outputs the acquired information to the determination unit 270.

(5) Determination Unit

The determination unit 270 uses the first information and second information acquired by the information acquisition unit 260 to determine whether or not the marginal distance $D_2$ about the master node 200 meets a condition which depends on the width of the guard area $D_1$ and the communication distance $R_{sec}$ assumed for the secondary system. Here, the communication distance $R_{sec}$ assumed for the secondary system may be, for example, a communication distance desired for secondary system. Alternatively, the communication distance $R_{sec}$ assumed for the secondary system may be the communication distance about the secondary system (e.g., acceptable communication distance) which is notified to the master node 200 by the SSM 100. The above condition used by the determination unit 270 may be, for example, a condition expressed by any of the above described conditional expressions (1) to (5). That is, the determination unit 270 uses the first information and second information to determine whether or not the marginal distance $D_2$ exceeds the threshold set depending on the width of the guard area $D_1$ and the communication distance $R_{sec}$. Then, the determination unit 270 outputs a determination result to the power control unit 250.

If the marginal distance $D_2$ is determined to meet the above condition by the determination unit 270, the power control unit 250 may use the transmission power corresponding to the communication distance $R_{sec}$ to configure the secondary system. On the other hand, if the marginal distance $D_2$ is determined to not meet the above condition by the determination unit 270, the power control unit 250, after the master node 200 moves or with the communication distance being shortened, controls the determination unit 270 to again determine the condition about the marginal distance $D_2$. In this way, in the case where determination of the condition about the marginal distance $D_2$ is made by the master node 200, the determination about the marginal distance $D_2$ in the SSM 100.

(6) Storage Unit

The storage unit 280 stores a program and data for operation for the master node 200 using a storage medium such as a hard disk or semiconductor memory.

[3-2. Flow of Process]

In this section, a description will be given of two examples of the flow of the communication control processing by the above described master node 200. In a first example, the determination about the marginal distance $D_2$ is made by the SSM 100. In a second example, the determination about the marginal distance $D_2$ is made by the master node 200.

(1) Condition Determination by SSM

Figure 9:
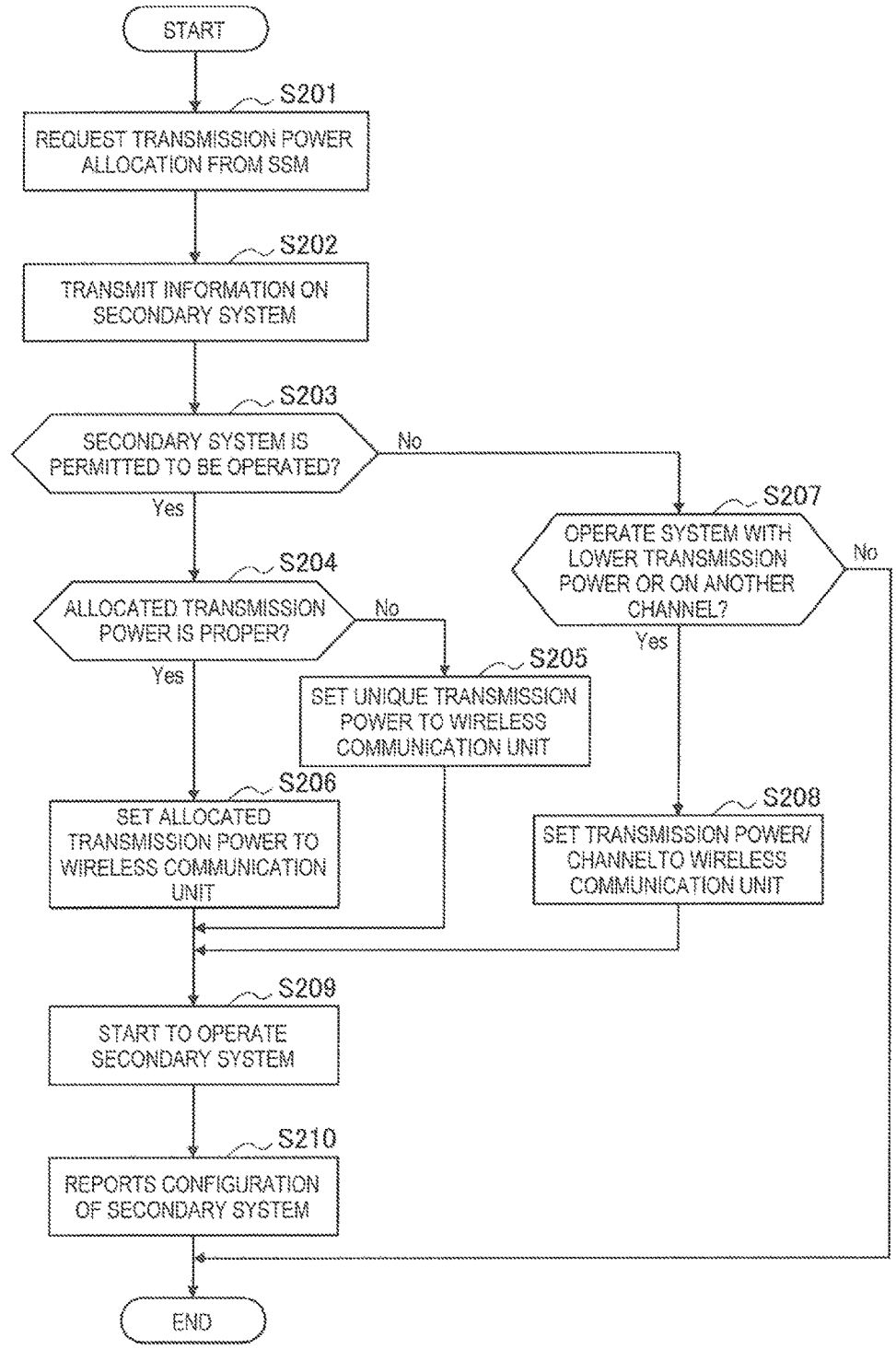
FIG. 9 is a flowchart illustrating a first example of the flow of the communication control processing by the master node.

FIG. 9 is a flowchart illustrating the first example of the flow of the communication control processing by the master node 200. First, the power control unit 250 requests the transmission power allocation from the SSM 100 (step S201), and transmits the information on the secondary system to the SSM 100 (step S202). The information transmitted here may include information such as the positional information on the master node 200, communication distance desired for the secondary system, and use channel.

Next, when a response from the SSM 100 is received, the power control unit 250 determines whether or not the secondary system is permitted to be operated (step S203). If the secondary system is permitted to be operated, the power control unit 250 further determines whether or not the allocated transmission power is proper (step S204). For example, if an excessive transmission power is allocated, the power control unit 250 may set a unique transmission power to accomplish the desired communication distance to the wireless communication unit 215 (step S205). On the other hand, if the allocated transmission power is proper, the power control unit 250 sets the relevant allocated transmission power to the wireless communication unit 215 (step S206).

If the secondary system is not permitted to be operated at step S203, the power control unit 250 determines whether or not to operate the secondary system with a lower transmission power or on another frequency channel (step S207). In the case where the secondary system is operated with a lower transmission power or on another frequency channel, the power control unit 250 sets a lower transmission power or a new frequency channel to the wireless communication unit 215 (step S208).

If the transmission power and the frequency channel are set at step S205, step S206, or step S208, the master node 200 starts to operate the secondary system (step S209). Then, the power control unit 250 reports the configuration of the secondary system to the SSM 100 (step S210).

(2) Condition Determination by Master Node

Figure 10:
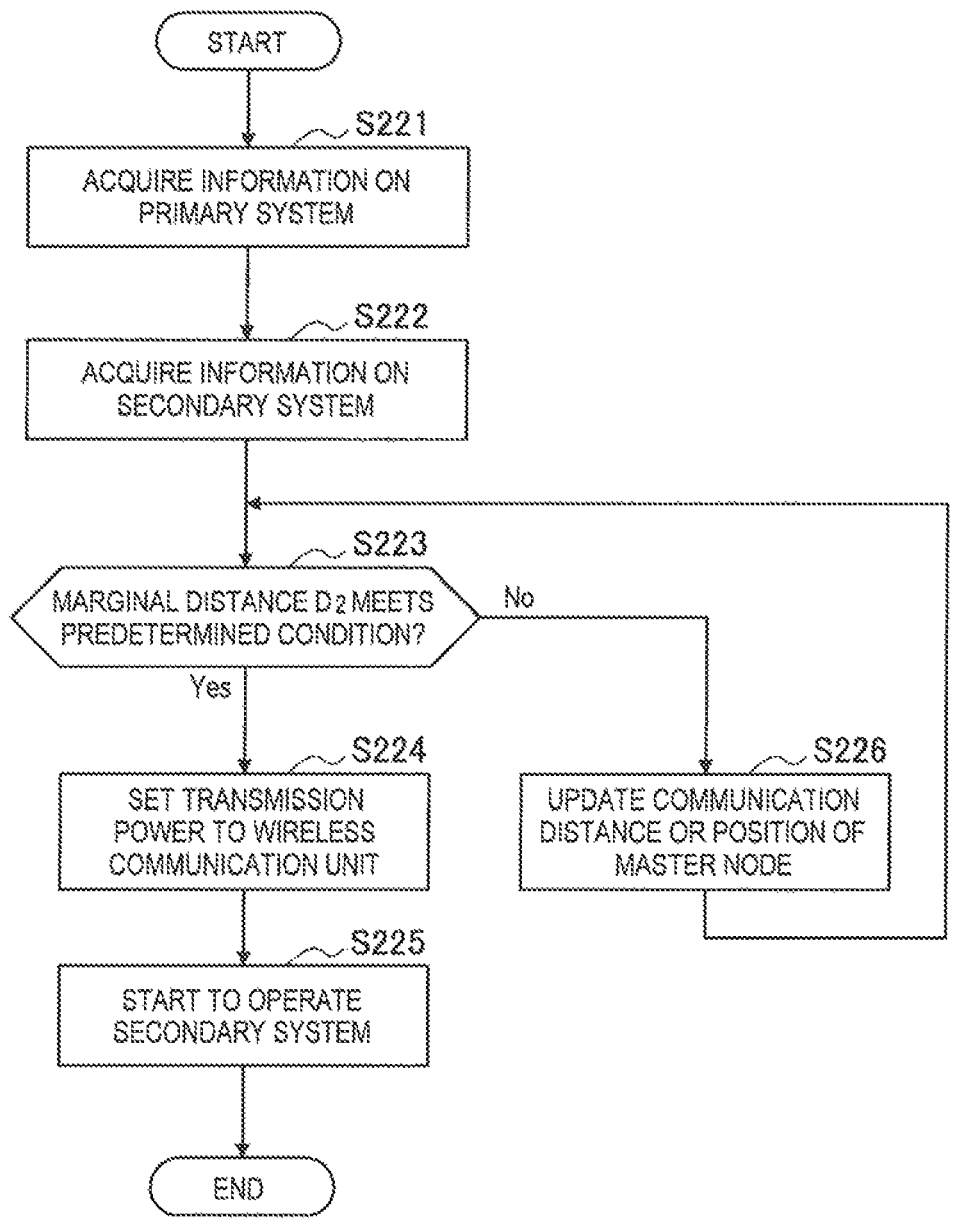
FIG. 10 is a flowchart illustrating a second example of the flow of the communication control processing by the master node.

FIG. 10 is a flowchart illustrating the second example of the flow of the communication control processing by the master node 200. First, the information acquisition unit 260 acquires the first information concerning the position of the guard area for the primary system from the SSM 100 (step S221). Additionally, the information acquisition unit 260 acquires the second information concerning the position of the master node 200 (step S222)

Next, the determination unit 270 uses the acquired first information and second information to determines whether or not the marginal distance $D_2$ about the master node 200 meets a condition which depends on the width of the guard area $D_1$ and the communication distance $R_{sec}$ assumed for the secondary system (step S223). Here, if the marginal distance $D_2$ meets the above condition, the power control unit 250 sets the transmission power corresponding to the communication distance $R_{sec}$ to the wireless communication unit 215 (step S224). Then, the master node 200 starts to operate the secondary system (step S225). On the other hand, if the marginal distance $D_2$ does not meet the above condition at step S223, the communication distance $R_{sec}$ may be changed to shorter value and the position of the master node 200 is updated depending on move of the master node 200 (step S226). After that, the determination unit 270 may again make the determination of step S223.

<4. Application to Interference Control between Secondary Systems>

In the above described embodiment, through the condition determination about the marginal distance $D_2$ which corresponds to an interval between the reference point of the primary system and the master node 200, the transmission power able to be mutually used by the master node and slave node is easily allocated to the secondary system. This can prevent the wireless signal transmitted from the slave node from giving an excessive interference to the primary reception station. The mechanism like this, as is described in this section, can be also applicable in order to prevent an interference between the secondary systems.

FIG. 11 is an explanatory diagram for explaining an exemplary parameter regarding a distance used for an interference control between the secondary systems. FIG. 11 shows a communication distance $R_{secA}$ assumed for the secondary system as a transmission power allocation target and a communication distance $R_{secB}$ of a secondary system near the relevant secondary system (hereinafter, referred to as near system). A distance $D_3$ represents a width of the guard area temporarily set for the near system. The width of the guard area $D_3$ for the near system may be defined as a fixed value in advance. Alternatively, the width of the guard area $D_3$ for the near system may be variably decided by multiplying the communication distance $R_{secB}$ of the relevant near system by a constant rate, for example. The distance $D_2$ is a marginal distance which corresponds to an interval between the reference point on the outer border of the guard area temporarily set (on the outer border of the service area if $D_3$=0) and the master node 200.

In the example of FIG. 11, if a next conditional expression (6) holds between the marginal distance $D_2$, width of the guard area $D_3$, and communication distance $R_{sec}$, even if the slave node uses the same transmission power as the master node, the wireless signal transmitted from the relevant slave node does not practically reach of the service area for the near system.

$$D_2 \geq 2 \cdot R_{sec} - D_3 \quad (6)$$

Therefore, the slave node can easily use the same transmission power as the master node, allowing a complex control of the transmission power to not be needed for the slave node. In addition, as a next expression, a weight coefficient may be introduced to the conditional expression (6).

$$D_2 \geq 2\alpha_{sec} \cdot R_{sec} - \alpha_3 D_3 \quad (7)$$

To be more general, these conditional expressions may be expressed by a function as follows.

$$D_2 \geq Th_3 = f(R_{sec}, D_3) \quad (8)$$

According to a conditional expression (8), the determination unit 140 in the SSM 100 determines whether or not the marginal distance $D_2$ exceeds a threshold $Th_3$ set depending on the width of the guard area $D_3$ temporarily set for the near system and the communication distance $R_{sec}$. Then, if the marginal distance $D_2$ exceeds the threshold $Th_3$, the secondary control unit 150 controls the master node 200 to operate the secondary system with a given transmission power. A given transmission power may be typically a transmission power corresponding to the above communication distance $R_{sec}$. Here, a given transmission power may be applied to not only the master node 200 but also the slave node. Note that the determination unit 140 may use a next conditional expression (9) or (10) when $D_3>0$, instead of the conditional expressions (6) to (8).

$$D_2 \geq R_{sec} + D_3 \text{ and } D_3 \geq R_{sec} \quad (9)$$

$$D_2 \geq R_{sec} \text{ and } D_3 \geq R_{sec} \quad (10)$$

FIG. 12 is a flowchart illustrating an exemplary flow of the power allocation processing by the SSM 100 for the interference control between the secondary systems. With reference to FIG. 12, first, the information acquisition unit 130 acquires the information on the secondary system from the master node 200 as a transmission power allocation target (step S301). The information acquired here includes the second information concerning the position of the master node 200. Next, the information acquisition unit 130 acquires information on the near system which is managed in the storage unit 180 (step S302). The information acquired here includes the first information concerning the position of the service area which is used to set the guard area to the near system (e.g., information indicating position of the master node of the near system and communication distance). Then, the determination unit 140 temporarily sets the guard area to the near system (step S303).

Next, the determination unit 140 determines whether or not the marginal distance $D_2$ about the master node 200 the above described predetermined condition (e.g., any of the conditional expressions (6) to (10)) which depends on the width of the guard area $D_3$ for the near system and the communication distance $R_{sec}$ assumed for the secondary system (step S304).

If the marginal distance $D_2$ is determined to meet a predetermined condition at step S304, the secondary control unit 150 allocates a given transmission power corresponding to the communication distance $R_{sec}$ to the secondary system (step S305). Then the secondary control unit 150 permits the master node 200 to operate the secondary system (step S306).

On the other hand, if the marginal distance $D_2$ is determined to not meet a predetermined condition at step S304, the secondary control unit 150 calculates a transmission power allocable (step S306). For example, the transmission power allocable may be calculate such that a reception power of the wireless signal from the relevant slave node is equal to or less than the acceptable interference amount at the reference point of the near system even in a case where the slave node is positioned around the edge of the service area for the secondary system. The transmission power which may be calculated here has a value lower than the transmission power corresponding to the above communication distance $R_{sec}$. Then, the secondary control unit 150 instructs the master node 200 to use the calculated transmission power (step S307). Here, instead of step S306 and S307, other frequency channels different from the frequency channel allocated to the near system may be suggested, or the secondary system may be refused to be operated.

After that, the secondary control unit 150 acquires a report on the configuration of the secondary system from the master node 200 having configured the secondary system (step S308). Then, the secondary control unit 150 updates the information on the secondary system which is managed in the storage unit 180 (step S309).

<5. Conclusion>

One embodiment and applicable example thereof of the technology of the present invention are described in detail so far with using FIG. 1 to FIG. 12. According to this embodiment, determined is whether or not the marginal distance which corresponds to an interval between the reference point of the primary system or near system and the master node of the secondary system meets a condition which depends on the width of the guard area and the communication distance assumed for the relevant secondary system, and if the relevant condition is met, the secondary system is operated with a given transmission power. This prevents the wireless signal transmitted from the relevant slave node from causing an excessive interference even if the slave node of the secondary system uses the transmission power equivalent to that of the master node. Therefore, the slave node can be allowed to easily use a transmission power equivalent to the transmission power allocated to the master node. This means that eliminated is the necessity to provide a complex transmission power calculation mechanism for each of the master node and the slave node. Therefore, introduction of the secondary system is facilitated. In addition, even if the position of the slave node is not known at the start of operation of the secondary system, the wireless signal transmitted from the slave node can be prevented from causing an excessive interference.

The above assumed communication distance may be the desired distance notified to the secondary system manager by the master node. In that case, if the above condition is met, the transmission power corresponding to a communication distance desired for the master node can be easily allocated to the secondary system. In addition, the above assumed communication distance may be a communication distance stored in the secondary system manager using the storage medium in advance. In that case, if the above condition is met, the transmission power corresponding to the relevant communication distance can be easily allocated to the secondary system.

If the above condition is determined to not be met, the master node may be instructed to use a transmission power lower than the transmission power corresponding to the above assumed communication distance. Therefore, only in the case where the above condition is not met, the secondary system manager can perform detail calculation of transmission power with taking into consideration the position of the master node, path loss and the like. That is, a calculation load on the secondary system manager may be suppressed.

Moreover, the determination of the above marginal distance may be made by the master node of the secondary system instead of the secondary system manager. In that case, the master node (or a provider who locates the master node) can voluntarily adjust the configuration of the secondary system. Further, a load on the secondary system manager can be suppressed, allowing an overhead of signaling between the manager and the master node to be reduced.

A sequence of control processing by each apparatus described herein may be realized by using software, hardware, or a combination of software and hardware. Programs constituting software are stored in, for example, a storage medium provided inside or outside each apparatus in advance. Then, for example, each program is read into RAM (Random Access Memory) during execution and executed by a processor such as CPU (Central Processing Unit).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

Additionally, the present disclosure may also be configured as below.

(1)

A communication control device including:

an information acquisition unit acquiring first information and second information, the first information concerning a position a guard area for a first wireless communication system, the second information concerning a position of a master node of a second wireless communication system which is secondarily operated using a frequency channel used by the first wireless communication system;

a determination unit determining, using the first information and the second information acquired by the information acquisition unit, whether or not an interval between a reference point of the first wireless communication system and the master node meets a condition which depends on a width of the guard area and a communication distance assumed for the second wireless communication system; and a control unit causing the second wireless communication system to be operated with a given transmission power if the determination unit determines the interval meets the condition.

(2)

The communication control device according to (1), wherein the communication control device is a manager managing secondary usage of the frequency channel, and wherein the communication distance is a desired distance notified to the manager by the master node.

(3)

The communication control device according to (1), wherein the communication control device is a manager managing a secondary usage of the frequency channel, and wherein the communication distance is a communication distance about a secondary system which is held in the communication control device in advance.

(4)

The communication control device according to (2) or (3), wherein if the determination unit determines the condition is not met, the control unit instructs the master node to use a transmission power lower than a transmission power corresponding to the communication distance.

(5)

The communication control device according to (2) or (3), wherein if the determination unit determines the condition is not met, the control unit suggests usage of another frequency channel to the master node.

(6)

The communication control device according to (2) or (3), wherein if the determination unit determines the condition is not met, the control unit does not permit the second wireless communication system to be operated.

(7)

The communication control device according to (1), wherein the communication control device is the master node, and wherein the communication distance is a communication distance about a secondary system notified to the master node by a manager managing the secondary usage of a frequency channel.

(8)

The communication control device according to any one of (1) to (6), wherein the communication control device is a manager managing a secondary usage of the frequency channel, and wherein after the determination unit determines the condition is met, the control unit, when notified by the master node of that the given transmission power is excessive for the second wireless communication system, updates the given transmission power to a lower value.

(9)

The communication control device according to any one of (1) to (8), wherein the first wireless communication system is a primary system, and wherein the second wireless communication system is a secondary system.

(10)

The communication control device according to any one of (1) to (8), wherein each of the first wireless communication system and the second wireless communication system is a secondary system secondarily operated using a frequency channel allocated to a primary system.

(11)

The communication control device according to (10), wherein the width of the guard area for the first wireless communication system is a fixed value or a variable value decided depending on of a communication distance the first wireless communication system.

(12)

The communication control device according to any one of (1) to (11), wherein the reference point exists on an outer border of the guard area, or on an outer border of a service area for the first wireless communication system if the first wireless communication system does not have the guard area.

(13)

The communication control device according to (12), wherein the condition is a condition based on comparison between the interval and a difference obtained by subtracting the width of the guard area from twice the communication distance assumed for the second wireless communication system.

(14)

A communication control method, for a communication control device controlling a second wireless communication system which is secondarily operated using a frequency channel used by a first wireless communication system, the method comprising:

acquiring first information and second information, the first information concerning a position of a guard area for the first wireless communication system, the second information concerning a position of a master node of the second wireless communication system;

determining, using the acquired first information and the second information, whether or not an interval between a reference point of the first wireless communication system and the master node meets a condition which depends on a width of the guard area and a communication distance assumed for the second wireless communication system; and causing the second wireless communication system to be operated with a given transmission power if the interval is determined to meet the condition.

(15)

A communication control system comprising:

a master node of a second wireless communication system which is secondarily operated using a frequency channel used by a first wireless communication system; and a communication control device which controls operation of the second wireless communication system performed by the master node, wherein the communication control device includes an information acquisition unit acquiring first information and second information, the first information concerning a position of a guard area for the first wireless communication system, the second information concerning a position of the master node, a determination unit determining, using the first information and the second information acquired by the information acquisition unit, whether or not an interval between a reference point of the first wireless communication system and the master node meets a condition which depends on a width of the guard area and a communication distance assumed for the second wireless communication system, and a control unit causing the master node to operate the second wireless communication system with a given transmission power if the determination unit determines the interval meets the condition.

REFERENCE SIGNS LIST 1 communication control system
30 data server
100 communication control device (secondary system manager)
130 information acquisition unit
140 determination unit
150 control unit
200 communication control device (master node)
250 control unit
260 information acquisition unit
270 determination unit
202 slave node

The invention claimed is:

1. A master node of a second wireless communication system which is secondarily operated based on a first frequency channel used by a first wireless communication system, the master node comprising:

a power control unit configured to:
request a transmission power allocation from a communication control device;
transmit information associated with a position of the master node to the communication control device;
receive a response from the communication control device, wherein the response includes a given transmission power allocation for the second wireless communication system;
determine that the second wireless communication system is permitted to operate and the given transmission power allocation is proper; and
set the given transmission power allocation to a wireless communication unit based on the determination,
wherein the given transmission power allocation is based on an interval between a reference point of the first wireless communication system and the master node, wherein the interval satisfies a condition, and
wherein the condition is based on a guard area for the first wireless communication system and a communication distance associated with the second wireless communication system.

2. The master node according to claim 1,
wherein the first wireless communication system is a primary system, and
wherein the second wireless communication system is a secondary system.

3. The master node according to claim 1,
wherein each of the first wireless communication system and the second wireless communication system is a secondary system, secondarily operated based on the first frequency channel allocated to a primary system.

4. The master node according to claim 1,
wherein the communication distance is a distance notified to the communication control device by the master node, and
wherein the communication distance is associated with a secondary system.

5. The master node according to claim 1,
wherein a secondary usage of the first frequency channel is managed by the communication control device.

6. The master node according to claim 1,
wherein, based on the condition that is unsatisfied, the power control unit is further configured to transmit a first power, wherein the first power is lower than a second power associated with the communication distance.

7. The master node according to claim 6,
wherein, based on the condition that is unsatisfied, the power control unit is further configured to use a second frequency channel to transmit the first power.

8. The master node according to claim 1,
wherein, based on the condition that is unsatisfied, the power control unit is further configured to prevent an operation of the second wireless communication system.

9. The master node according to claim 1,
wherein, based on the condition that is satisfied and based on the given power transmission allocation that is excessive for the second wireless communication system, the power control unit is further configured to decrease a value of the given power transmission allocation.

10. A master node of a second wireless communication system which is secondarily operated based on a first frequency channel used by a first wireless communication system, the master node comprising:
an information acquisition unit configured to acquire first information and second information,
wherein the first information is associated with a guard area for the first wireless communication system, and the second information is associated with a position of the master node of the second wireless communication system;
a determination unit configured to determine, based on the first information and the second information acquired by the information acquisition unit, that an interval between a reference point of the first wireless communication system and the master node satisfies a condition,
wherein the condition is based on the guard area and a communication distance associated with the second wireless communication system; and
a power control unit configured to operate the second wireless communication system with a given transmission power allocation based on the determination that the interval satisfies the condition.

11. The master node according to claim 10,
wherein the communication distance is a distance notified to a communication control device by the master node.

12. The master node according to claim 10,
wherein the first wireless communication system is a primary system, and
wherein the second wireless communication system is a secondary system.

13. The master node according to claim 10,
wherein each of the first wireless communication system and the second wireless communication system is a secondary system secondarily operated based on the first frequency channel allocated to a primary system, and
wherein the communication distance is associated with the secondary system.

14. The master node according to claim 10,
wherein a secondary usage of the first frequency channel is managed by a communication control device.

15. The master node according to claim 10,
wherein, based on the condition that is unsatisfied, the power control unit is further configured to:
transmit a first power, wherein the first power is lower than a second power corresponding to the communication distance; and
use a second frequency channel to transmit the first power.

16. The master node according to claim 10,
wherein, based on the condition that is unsatisfied, the power control unit is further configured to prevent an operation of the second wireless communication system.

17. The master node according to claim 10,
wherein, based on the condition that is satisfied and based on the given power transmission allocation that is excessive for the second wireless communication system, the power control unit is further configured to decrease a value of the given power transmission allocation.

18. The master node according to claim 10,
wherein the guard area for the first wireless communication system is one of a fixed value or a variable value, based on a communication radius of the first wireless communication system.

19. The master node according to claim 10,
wherein the reference point exists on one of a first outer border of the guard area or a second outer border of a service area for the first wireless communication system.

20. The master node according to claim 10,
wherein the condition is based on a comparison between the interval and a difference obtained based on a subtraction of the guard area from twice the communication distance associated with the second wireless communication system.

* * * * *